(12) United States Patent
Komatsu et al.

(10) Patent No.: US 11,820,553 B2
(45) Date of Patent: Nov. 21, 2023

(54) CONTAINER IN WHICH INNER SURFACE IS FORMED FROM OLEFIN RESIN LAYER

(71) Applicants: TOYO SEIKAN GROUP HOLDINGS, LTD., Tokyo (JP); TOYO SEIKAN CO., LTD., Tokyo (JP)

(72) Inventors: Ikuo Komatsu, Yokohama (JP); Yosuke Akutsu, Yokohama (JP); Keisuke Nyuu, Yokohama (JP); Satomi Ozawa, Yokohama (JP)

(73) Assignees: TOYO SEIKAN GROUP HOLDINGS, LTD., Tokyo (JP); TOYO SEIKAN CO., LTD., Tokyo (JP)

( * ) Notice: Subject to any disclaimer, the term of this patent is extended or adjusted under 35 U.S.C. 154(b) by 29 days.

(21) Appl. No.: 17/504,247

(22) Filed: Oct. 18, 2021

(65) Prior Publication Data

US 2022/0033142 A1 Feb. 3, 2022

Related U.S. Application Data

(63) Continuation of application No. 15/736,837, filed as application No. PCT/JP2016/069775 on Jul. 4, 2016, now abandoned.

(30) Foreign Application Priority Data

Jul. 9, 2015 (JP) .................................. 2015-137436

(51) Int. Cl.
*B65D 23/02* (2006.01)
*B32B 27/32* (2006.01)
(Continued)

(52) U.S. Cl.
CPC .............. *B65D 23/02* (2013.01); *B29C 49/22* (2013.01); *B32B 27/08* (2013.01); *B32B 27/20* (2013.01);
(Continued)

(58) Field of Classification Search
CPC ..... B29C 49/22; B29C 49/0005; B65D 23/04; B65D 1/0207; B65D 85/72; B65D 23/02;
(Continued)

(56) References Cited

U.S. PATENT DOCUMENTS 4,647,463 A 3/1987 Hoover
4,956,232 A 9/1990 Balloni et al.
(Continued)

FOREIGN PATENT DOCUMENTS

CN 1188498 A 7/1998
CN 1446247 A 10/2003
(Continued)

OTHER PUBLICATIONS

International Search Report for PCT/JP2016/069775 dated Oct. 4, 2016 [PCT/ISA/210].
(Continued)

*Primary Examiner* — Monica A Huson
(74) *Attorney, Agent, or Firm* — Sughrue Mion, PLLC (57) ABSTRACT

A method of producing a directly blow-formed container. The method includes subjecting a multilayered parison having an inner surface formed of an olefin resin to direct blow forming, the olefin resin containing (i) an organic bleeding lubricant having a melting point of not higher than 50° C. in an amount of 5 to 10% by mass, and (ii) a high silica zeolite having a silica/alumina mole ratio of not less than 80 in an amount of 0.2 to 3.0% by mass.

3 Claims, 1 Drawing Sheet

(51) Int. Cl.
| | |
|---|---|
| *B65D 85/72* | (2006.01) |
| *B32B 27/08* | (2006.01) |
| *B32B 27/20* | (2006.01) |
| *B32B 27/30* | (2006.01) |
| *B65D 1/02* | (2006.01) |
| *B65D 65/40* | (2006.01) |
| *B65D 23/04* | (2006.01) |
| *B29C 49/22* | (2006.01) |
| *C08K 5/09* | (2006.01) |
| *C08K 7/26* | (2006.01) |
| *B29K 105/00* | (2006.01) |
| *B29K 509/00* | (2006.01) |
| *B29C 49/00* | (2006.01) |
| *B29K 23/00* | (2006.01) |
| *B65D 25/14* | (2006.01) |

(52) U.S. Cl.
CPC ........... *B32B 27/306* (2013.01); *B32B 27/32* (2013.01); *B65D 1/0207* (2013.01); *B65D 23/04* (2013.01); *B65D 65/40* (2013.01); *B65D 85/72* (2013.01); *C08K 5/09* (2013.01); *C08K 7/26* (2013.01); *B29C 49/0005* (2013.01); *B29K 2023/00* (2013.01); *B29K 2105/0005* (2013.01); *B29K 2509/00* (2013.01); *B32B 2250/05* (2013.01); *B32B 2250/246* (2013.01); *B32B 2264/102* (2013.01); *B32B 2272/00* (2013.01); *B32B 2305/026* (2013.01); *B32B 2307/538* (2013.01); *B32B 2307/746* (2013.01); *B32B 2323/046* (2013.01); *B32B 2439/60* (2013.01); *B32B 2439/70* (2013.01); *B65D 25/14* (2013.01); *C08K 2201/005* (2013.01)

(58) Field of Classification Search
CPC .......... B65D 65/40; B65D 25/14; C08K 5/09; C08K 7/26; C08K 2201/005; B32B 27/306; B32B 27/32; B32B 27/20; B32B 27/08; B32B 2250/246; B32B 2307/746; B32B 2323/046; B32B 2439/70; B32B 2439/60; B32B 2250/05; B32B 2305/026; B32B 2307/538; B32B 2272/00; B32B 2264/102; C08L 23/02; B29K 2509/00; B29K 2023/00; B29K 2105/0005
See application file for complete search history.

(56) References Cited

U.S. PATENT DOCUMENTS

| | | |
|---|---|---|
| 4,957,768 A | 9/1990 | Dutilh |
| 5,073,452 A | 12/1991 | Satou et al. |
| 5,106,665 A | 4/1992 | Akao et al. |
| 5,847,042 A | 12/1998 | Hosoda et al. |
| 5,880,053 A | 3/1999 | Roland et al. |
| 6,004,733 A | 12/1999 | Ishii et al. |
| 6,312,828 B1 * | 11/2001 | Akao ............... G03C 3/00 524/424 |
| 7,378,467 B2 | 5/2008 | Yan |
| 9,701,859 B2 | 7/2017 | Chen et al. |
| 2003/0129433 A1 | 7/2003 | Hara et al. |
| 2003/0187149 A1 | 10/2003 | Schmidt et al. |
| 2006/0047040 A1 | 3/2006 | Shida et al. |
| 2010/0092621 A1 | 4/2010 | Akutsu et al. |
| 2011/0290798 A1 | 12/2011 | Corbett et al. |
| 2014/0106096 A1 | 4/2014 | Doutt et al. |
| 2014/0147627 A1 | 5/2014 | Aizenberg et al. |
| 2014/0187666 A1 | 7/2014 | Aizenberg et al. |
| 2014/0290731 A1 | 10/2014 | Aizenberg et al. |
| 2014/0290732 A1 | 10/2014 | Aizenberg et al. |
| 2016/0075117 A1 | 3/2016 | Akutsu et al. |
| 2016/0152786 A1 | 6/2016 | Akutsu et al. |

FOREIGN PATENT DOCUMENTS

| | | |
|---|---|---|
| EP | 1 524 202 A1 | 4/2005 |
| EP | 2 873 630 A1 | 5/2015 |
| EP | 3 150 510 A1 | 4/2017 |
| JP | 8-104370 A | 4/1996 |
| JP | 2008-222291 A | 9/2008 |
| JP | 2009-214914 A | 9/2009 |
| JP | 2010-214910 A | 9/2010 |
| JP | 2011-255901 A | 12/2011 |
| JP | 5673905 B1 | 2/2015 |
| JP | 2015-100968 A | 6/2015 |
| WO | 2012/100099 A2 | 7/2012 |
| WO | 2015/012358 A1 | 1/2015 |

OTHER PUBLICATIONS

Extended European Search Report dated Feb. 4, 2019 issued by the European Patent Office in counterpart application No. 16821375.9.
"ACS Material Mordenite Zeolite Technical Data Sheet", ACS Material® Advance Chemical Supplier, Sep. 30, 2018, XP055548038, pp. 1-4, 4 pages total.

* cited by examiner

CONTAINER IN WHICH INNER SURFACE IS FORMED FROM OLEFIN RESIN LAYER

CROSS-REFERENCE TO RELATED APPLICATIONS

This application is a Rule 53(b) Continuation Application of U.S. application Ser. No. 15/736,837 filed Dec. 15, 2017, which is a National Stage of International Application No. PCT/JP2016/069775 filed Jul. 4, 2016, claiming priority based on Japanese Patent Application No. 2015-137436 filed Jul. 9, 2015, the disclosures of all of which are incorporated herein by reference in their respective entireties.

TECHNICAL FIELD

The present invention relates to a container having an inner surface formed of an olefin resin layer. More specifically, the present invention relates to a container having an inner layer that includes an organic bleeding lubricant, thereby providing an excellent slip-down property with respect to a content.

BACKGROUND ART

A container to contain a fluid content is required to have a discharge ability with respect to the contents irrespective of materials of the container. In a case of containing a less viscous liquid such as water, there is substantially no necessity to take the discharge ability into consideration. However, in a case of containing more viscous and dense substances with high viscosity like mayonnaise and ketchup, the discharge ability may have a great influence on both a plastic container and a glass container. More specifically, the content would not be discharged quickly even by tilting the container, and it would adhere to the container wall. In particular, a considerable amount of the content would not be discharged but remain on the bottom of the container, and thus, it cannot be used up.

Under this circumstance, the container is required to have a slip-down property to allow quick discharge of the content from the container inner surface.

An example of proposed containers includes an organic lubricant blended in the olefin resin layer (inner surface layer) that forms the inner surface of the container (see e.g., Patent documents 1, 2). Since the olefin resin layer of the container inner surface of the container is suitable for bleeding of lubricant, the lubricant bleeds quickly to be distributed on the inner surface of the container, thereby improving the slip-down property with respect to the content in the container.

On the other hand, recently there has been a technique proposed to improve the slip-down property with respect to viscous and dense substances (see e.g., Patent document 3).

Nowadays, this technique is drawing attention because it can improve drastically the slip-down property in comparison with a case of adding an additive such as a lubricant to synthetic resins that form the article surface. However, this technique may cause some problems. For instance, the liquid forming a liquid film may migrate to the content, thereby to degrade the flavor of the content, or the slip-down property may deteriorate gradually with the discharge of the content. For this reason, a conventional technique is still employed, which is blending a lubricant in the resin layer forming the container inner surface in order to improve the slip-down property with respect to the contents.

Further a study by the present inventors has clarified that the flavor of the content may be degraded also in a case of blending a lubricant in the resin layer that forms the container inner surface, although the degradation is not so much as the case where the liquid film is formed on the surface. In particular, the flavor property tends to be degraded more when a lubricant including fatty acid is used or when the container is filled with an emulsion such as mayonnaise-type food as the content.

PRIOR ART DOCUMENTS

Patent Documents

Patent Document 1: JP-A-2008-222291
Patent Document 2: JP-A-2009-214914
Patent Document 3: WO2012/100099

SUMMARY OF THE INVENTION

Problems to be Solved by the Invention

Therefore, an object of the present invention is to provide a container having an inner surface formed of an olefin resin layer that includes an organic bleeding lubricant. The container has an excellent slip-down property with respect to a content and also excellent flavor retention with respect to the content.

Another object of the present invention is to provide a container for containing in particular an emulsion as the content.

Means for Solving the Problems

The present invention provides a container having an inner surface formed of an olefin resin layer. The olefin resin layer includes an organic bleeding lubricant, and in which an inorganic porous agent is blended.

In the container of the present invention, it is suitable that
(1) the organic bleeding lubricant is at least one kind of saturated or unsaturated fatty acid having a melting point of not higher than 50° C.;
(2) when extraction is conducted by filling the container with n-heptane as an extract, 10 to 150 µg/ml of an evaporation residue of the extract is obtained;
(3) the inorganic porous agent is high silica zeolite having a silica/alumina ratio of not less than 80;
(4) the container has a multilayered structure including the olefin resin layer of the inner surface, and the inorganic porous agent is blended selectively in the olefin resin layer of the inner surface;
(5) the inorganic porous agent is blended in an amount of 0.2 to 3.0% by mass in the olefin resin layer that forms the container inner surface;
(6) the inorganic porous agent has an average particle diameter in a range of 0.1 to 4.9 µm;
(7) an average surface roughness Ra (JIS-B-0601-1994) of the inner surface of the container is not more than 0.3 µm; and
(8) the container is filled with an emulsion as a content.

Effects of the Invention

The container of the present invention exhibits an excellent slip-down property with respect to a content since an organic bleeding lubricant bleeds to be distributed on the inner surface of the container. Further, the inorganic porous agent blended in the olefin resin layer (inner surface layer) allows the container to exhibit excellent flavor retention with respect to the content.

That is, when a bleeding lubricant is distributed on the surface, the slip-down property with respect to the content (in particular, a water-containing substance) may be improved remarkably, but it is accompanied with degradation in the flavor retention. The reason is considered as follows. The organic bleeding lubricant is partly decomposed by heat during the formation to generate a low-molecular weight component, and the component may migrate to the content. In particular, a fatty acid based lubricant may easily generate low molecular weight aldehydes, ketones and the like during formation processes, thereby degrading considerably the flavor.

In contrast, in the present invention, the degradation in the flavor can be avoided effectively since the inorganic porous agent blended in the olefin resin layer as the inner layer adsorbs the low molecular weight component.

It has been known to blend an adsorbent such as an inorganic porous agent in a resin layer that forms the container in order to eliminate odor components that may degrade the flavor of the content. To the best knowledge of the present inventors, however, it has not been known at all to blend the adsorbent in the resin layer (inner surface layer) that forms the container inner surface to be in contact with the content, because such a measure to blend in the inner surface layer an additive that may affect the flavor of the content cannot be employed from the viewpoint of common sense and furthermore, there has been no idea that the organic bleeding lubricant may degrade the flavor.

The container of the present invention exhibits an excellent slip-down property with respect to viscous and dense substances. It exhibits an excellent slip-down property with respect to even a highly viscous substance having a viscosity of not less than 1260 mPa·s at 25° C., for instance. The container exhibits an excellent slip-down property with respect to not only highly-viscous substances such as non-oily substances represented by ketchup but emulsions such as mayonnaise-type food and various dressings, thereby retaining the flavors effectively.

MODE FOR CARRYING OUT THE INVENTION

Figure 1:
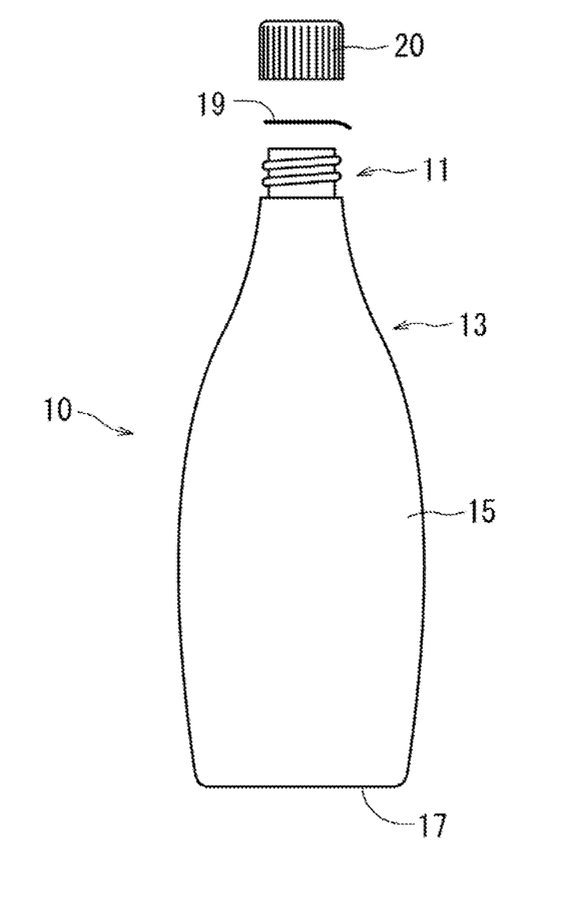
The FIGURE is a view showing a state of a direct blow forming bottle as a preferred example of a container of the present invention.

The container of the present invention has an inner surface formed of an olefin resin layer. This olefin resin layer includes an organic bleeding lubricant, and in which an inorganic porous agent is blended further.

Olefin Resin:

In the present invention, an olefin resin is selected from various thermoplastic resins to form the container inner surface. That is, the olefin resin can be used suitably as a polymer for a direct blow forming bottle used for containing a particularly viscous and dense content, since the olefin resin has an excellent bleeding ability with respect to an organic lubricant mentioned below, thereby allowing the organic lubricant to be distributed easily on the surface, and furthermore, it can make easily a flexible container.

Examples of the olefin resin include random or block copolymers of α-olefins such as low-density polyethylene, high-density polyethylene, polypropylene, poly(1-butene), poly(4-methyl-1-pentene) or ethylene, propylene, 1-butene, and 4-methyl-1-pentene, and a cyclic olefinic copolymer. Among them, the high-density polyethylene or the low-density polyethylene is preferred from the viewpoint of bleeding ability, and the low-density polyethylene having a density in a range of 0.900 to 0.935 g/cm$^3$ is most preferred.

Organic Bleeding Lubricant:

In the present invention, the organic bleeding lubricant included in the aforementioned olefin resin layer (the inner surface layer of container, which may be called hereinafter simply a lubricant) is distributed by bleeding on the surface (the container inner surface) of the olefin resin layer, thereby imparting a slip-down property with respect to the viscous and dense content.

Various examples of lubricants have been known, and typical examples are listed below.

(a) Hydrocarbon waxes such as natural or synthetic paraffin wax, micro wax, polyethylene wax, and chlorinated polyethylene wax, and, mineral waxes such as ceresin, and petroleum wax;

(b) Saturated or unsaturated fatty acids such as palmitic acid, stearic acid, lauric acid, oleic acid, and erucic acid;

(c) Saturated or unsaturated aliphatic amides such as stearic acid amide, palmitic acid amide, oleic acid amide, erucic acid amide, methylene bisstearoamide, and ethylene bisstearoamide;

(d) Fatty acid esters such as butyl stearate, hardened castor oil, and ethylene glycol monostearate;

(e) Fatty alcohols such as cetyl alcohol and stearyl alcohol;

(f) Metal soaps such as zinc stearate and calcium stearate;

(g) Polyorganosiloxane (silicone oil);

(h) Vegetable oils or vegetable waxes, such as salad oil, shirashime oil (refined rapeseed/soybean oil), corn oil, soybean oil, sesame oil, rapeseed oil, safflower oil, sunflower oil, rice oil, rice bran oil, camellia oil, palm oil, coconut oil, cottonseed oil, hempseed oil, grape oil, poppy seed oil, castor oil, tong oil, Jatropha oil, linseed oil, mustard oil, wheat germ oil, evening primrose oil, shiso (Japanese basil) oil, apricot kernel oil, Akebi oil, Camellia sasanqua oil, tea oil, walnut oil, white birch oil, olive oil, peanut oil, almond oil, avocado oil, hazelnut oil, grape seed oil, laurel oil, macadamia nut oil, argan oil, pumpkin seed oil, pecan nut oil, pistachio oil, jojoba oil, meadowfoam oil, coffee bean oil, marula nut oil, broccoli seed oil, peach kernel oil, cherry kernel oil, cranberry seed oil, pomegranate seed oil, kukui nut oil, neem oil, kiwi fruit seed oil, cacao butter, borage oil, shea butter, babassu oil, baobab oil, melon seed oil, mango butter, sal butter, kokum butter, rose hip oil, mongongo oil, bituminous oil, zinc oxide oil, processed shiso oil, sumac wax, candelilla wax, carnauba wax, and essential oil;

(i) Animal oils such as egg yolk oil, liver oil, shark oil, neatsfoot oil, beeswax, lard, beef tallow, bone fat, bone oil, fish oil, chicken oil, duck oil, goose oil, crab oil, horse oil, whale oil, dolphin oil, lanolin, schmalz, butter, emu oil, milk oil, mink oil, and squalene; and (j) Mineral oils such as liquid paraffin, amber oil, and oil shale.

These substances may be used alone or as a mixture of at least two thereof. In particular, lubricants commercially available for industrial application often include substances different in the number of carbon atoms at a certain ratio, and practically, in most cases a plurality of substances are mixed to be used.

In the present invention, from the viewpoint of favorable bleeding property and in particular an excellent slip-down property with respect to an emulsion, the saturated or unsaturated fatty acids are preferred among the aforementioned lubricants. Particularly, at least one kind of the saturated or unsaturated fatty acid having a melting point not higher than 50° C. is preferred. For instance, C6-C12 saturated fatty acid and C16-C22 unsaturated fatty acids are used most preferably. When the melting point is higher than the aforementioned range, the bleeding amount is decreased and the slip-down property deteriorates. When the carbon number is less than the aforementioned range, it may cause hygiene problem; when the carbon number is more than the range, it may raise the melting point and decrease the bleeding amount. From the viewpoint of the flavor, saturated fatty acids are used suitably.

When the content is food, cooking oils (edible oils) such as tempura oil (less-refined salad oil), salad oil, shirashime oil, chili oil and leek oil can be used suitably. When the content is a mayonnaise-type food, salad oil or tempura oil can be used particularly suitably.

The aforementioned lubricant is required to bleed to be distributed in an appropriate amount on the inner surface of the container, namely, the surface of the olefin resin layer. The bleeding amount (surface distribution amount) can be calculated by filling the container with n-heptane as an extract and extracting the lubricant that bleeds out on the surface under the conditions of 25° C.-60 minutes, thereby obtaining it as an evaporation residue of the extract. This test method is prescribed in the evaporation residue testing method of "Notification 370 from Ministry of Health and Welfare dated Dec. 28, 1959".

In the present invention, it is preferable that the lubricant is used in an amount such that the amount of the evaporation residue obtained in extraction with the n-heptane extract would be 10 to 150 µg/ml, in particular, 30 to 110 µg/ml. When the amount (bleeding amount) of the evaporation residue is less than the range, the slip-down property may deteriorate. When the amount exceeds the range, the formability or the flavor retention may be degraded due to excessive use of the lubricant.

As long as the bleeding amount is stably kept, there is no necessity of blending the lubricant in the olefin resin layer that forms the container inner surface, but for instance, the lubricant can be blended in a layer to be placed adjacent to the olefin resin layer.

Inorganic Porous Agent

In the present invention, the inorganic porous agent is blended in the olefin resin layer that forms the container inner surface. The inorganic porous agent serves to prevent degradation in the flavor property of the content, which is caused by the use of the aforementioned lubricant, thereby maintaining the flavor property of the content.

Examples of the inorganic porous agent include zeolite, silica gel, active aluminum oxide, magnesium silicate, talc, diatomaceous earth, and clays. These can be used alone or in combination of at least two thereof.

In the present invention, zeolite is preferred since it exhibits preferable flavor retention while not degrading the slip-down property when the aforementioned saturated or unsaturated fatty acid is used as the lubricant. In particular, high silica zeolite having silica/alumina molar ratio ($SiO_2/Al_2O_3$) of 80 or more is most suitable. Such zeolite is suitable, probably because it has tubular pores effectively serving to adsorb low-molecular weight aldehydes and ketones generated from the saturated or unsaturated fatty acid during formation of the container.

The aforementioned inorganic porous agent is used in a state of powder having an average particle diameter ($D_{50}$) of about 0.1 µm to about 4.9 µm in terms of volume measured by a laser diffraction scattering method, so that the inorganic porous agent is dispersed uniformly in the olefin resin layer. When the average particle diameter is smaller than the range, the flavor retention may be insufficient. When the same diameter is greater than the range, the transparency may be degraded.

The inorganic porous agent is blended in an amount of 0.2 to 3.0% by mass, in particular 0.5 to 2.0% by mass in the olefin resin layer that forms the container inner surface. When the amount is insufficient, the flavor retention may be unsatisfactory. Even when an excessive amount of the inorganic porous agent is used, further improvement in the flavor retention may not be expected, but a disadvantage of degradation in transparency may be caused.

In particular, when the inorganic porous agent having a silica/alumina molar ratio of 80 or more is used and it is blended in an amount of 0.5% by mass or more and when the n-heptane evaporation residue is controlled not more than 100 µg/ml, the flavor retention is particularly favorable to effectively reduce the polyethylene-odor originated from the container as well as the odor originated from a decomposed lubricant.

In a conventionally known technique, inorganic particles like the aforementioned inorganic porous agent are blended in the resin layer that forms the container inner surface in order to roughen the container inner surface, thereby improving the slip-down property with respect to the content. On the other hand, in the present invention, the inorganic porous agent is blended not to roughen the inner surface of the container, and thus, the blend amount is reduced. The container inner surface to be formed with the olefin resin layer blended with this inorganic porous agent is set to have a smooth surface having usually an average surface roughness Ra (JIS-B-0601-1994) of 0.3 µm or less. Even when the inner surface of the container is roughened, no problem may occur from the viewpoint of slip-down property. However, air bubbles may be caught between the container inner surface and the content, and the air bubbles may degrade the appearance of the container in an external observation of the container.

Layer Constitution:

The aforementioned container of the present invention is not limited to a single-layered structure having a container wall formed only of the olefin resin layer but it can be a multilayered structure including any other resin layer laminated on the olefin resin layer, as long as an inorganic porous agent is blended in the olefin resin layer that forms the container inner surface and further an organic bleeding lubricant is included.

In the present invention, it is particularly preferable to provide a multilayered structure having an intermediate layer that functions as a lubricant-barrier layer between an outer surface layer that forms the container outer surface and an olefin resin layer of the container inner surface, so that the organic bleeding lubricant may bleed selectively on the container inner surface.

Needless to say, no lubricant is blended in the intermediate layer functioning as a lubricant-barrier layer. For functioning as a lubricant-barrier layer, it is required that the intermediate layer be formed of a resin having a density of not less than 1.00 g/cm$^3$ and having a glass transition point (Tg) of not lower than 35° C. As a result, the intermediate layer formed of the resin becomes a dense layer, thereby functioning effectively as a lubricant-barrier layer to prevent or reduce effectively migration of the lubricant blended in the layer at the container inner surface side than the intermediate layer to the outer surface layer. As a result, the amount of the lubricant distributed by the bleeding on the container inner surface (the amount of the aforementioned evaporation residue of n-heptane extract) can be set easily within a predetermined range.

For instance, in a case of forming the intermediate layer by using a resin having a density or a glass transition point (Tg) lower than the aforementioned range, the intermediate layer may be coarse, and it cannot exhibit its function as a lubricant-barrier layer. As a result, migration of the lubricant blended in the layer placed inside the intermediate layer to the outer surface side cannot be prevented, which may make it difficult to control the amount of the lubricant bleeding onto the container inner surface.

The resin for forming the intermediate layer is not limited in particular as long as both the density and the glass transition point (Tg) are within the aforementioned ranges, and any appropriate shapeable thermoplastic resins can be used. Usually, it is preferable to use gas barrier resins such as ethylene vinyl alcohol copolymer (saponified ethylene vinyl acetate copolymer) and aromatic polyamide, and particularly preferably to use an ethylene vinyl alcohol copolymer. By using a gas barrier resin as a resin for forming the intermediate layer, it is possible to impart the intermediate layer with the lubricant-barrier property and further an oxygen barrier property. Since the ethylene vinyl alcohol copolymer exhibits particularly excellent oxygen barrier property, it can prevent or control effectively oxidative degradation of the oily content caused by oxygen permeation. As a result, the excellent slip-down property can be maintained and at the same time, the excellent content preservability can be ensured.

For the aforementioned ethylene vinyl alcohol copolymer, usually, a saponified copolymer obtained by saponifying an ethylene-vinyl acetate copolymer containing 20 to 60 mol % of ethylene, particularly preferably 25 to 50 mol %, is used suitably, so that the saponification degree becomes 96 mol % or more, particularly preferably 99 mol % or more. Among such copolymers, a copolymer having a density and glass transition point (Tg) within the aforementioned ranges is used selectively.

Further, the intermediate layer functioning as a lubricant-barrier layer preferably has a thickness usually in a range of 1 to 50 µm, suitably in a range of 9 to 40 µm. When this layer is extremely thin, its lubricant-barrier property may deteriorate, and thus, the lubricant blended in the layer closer to the container inner surface than the intermediate layer may migrate to the container outer surface side, thereby causing lack of the lubricant in the inner surface layer. Even when the layer is extremely thick, the lubricant-barrier property cannot be improved anymore, but some disadvantages may be caused, for instance, the thickness of the container wall may be increased more than necessary or the cost may increase.

When the gas barrier resin is used as an intermediate layer, preferably the intermediate layer is provided via an adhesive layer in order to enhance adhesiveness with the inner and outer layers and to prevent delamination. Thereby, the intermediate layer can be adhered and fixed securely to the inner and outer layers. Adhesive resins used for forming the adhesive layer are known per se, and for instance, they are resins containing a carbonyl group ($>C=O$) in the principal chain or the side chain, in an amount of 1 to 100 meq/100 g resin, in particular, 10 to 100 meq/100 g resin. Specific examples of such resins to be used as adhesive resins include: an olefin resin graft-modified with a carboxylic acid such as maleic acid, itaconic acid or fumaric acid or an anhydride thereof, or with an amide or an ester; an ethylene-acrylic acid copolymer; an ionically crosslinked olefin copolymer; and an ethylene-vinyl acetate copolymer. The adhesive resin layer may have a thickness with which a suitable degree of adhesive force is obtained, and the thickness is usually 0.5 to 20 µm, and suitably, about 1 to about 8 µm. The adhesive layer can also function as a lubricant-barrier layer if it satisfies the aforementioned conditions for density and glass transition point.

Further, in the multilayered structure provided with the lubricant-barrier intermediate layer, the outer surface layer for forming the container outer surface can be formed with various thermoplastic resins (for instance, polyester resins such as polyethylene terephthalate). In order to impart the container with a squeezing property so that the content can be squeezed out from the container, the outer surface layer is preferably formed of an olefin resin layer similarly to the container inner surface.

Needless to say, various bleeding adhesives can be blended in the outer surface layer for preventing the container from sticking to the other container or to a conveying belt, thereby improving the conveyance performance. In other words, due to the existence of the intermediate layer functioning as a lubricant-barrier layer, the bleeding additive blended in the outer surface layer may not bleed onto the container inner surface, and thus, the additive may not affect the slip-down property of the container inner surface.

Further in the multilayered structure provided with the aforementioned intermediate layer according to the present invention, a regrind layer, which is formed of a scrap resin generated during formation of the container and blended with a virgin olefin resin, can be placed between the intermediate layer functioning as the lubricant-barrier layer and either the container inner surface layer or the container outer surface layer. In this case, from the viewpoint of reusing the resources while maintaining the formability, the amount of the scrap resin is preferably in a range of about 10 to about 60% by mass with respect to 100 parts by mass of the virgin polyolefin resin.

The aforementioned scrap resin may be the one generated during formation of the container of the present invention, or generated during formation of any other container including an olefin resin.

Further, the regrind layer exhibits a high bleeding property similarly to the olefin resin layer that forms the container inner surface. Therefore, in a case of placing the regrind layer between the intermediate layer having a lubricant-barrier property and a container inner surface (olefin resin layer), the aforementioned bleeding lubricant can be blended in the regrind layer. That is, the lubricant blended in the regrind layer may bleed onto the container inner surface through the olefin resin that forms the container inner surface. As a result, even if no lubricant is blended in the olefin resin layer of the container inner surface, the olefin resin layer of the container inner surface may include the lubricant, whereby the lubricant may bleed to be distributed on the container inner surface.

Therefore, in a case of blending the lubricant in any of the olefin resin layer that forms the inner surface or the regrind layer, the amount of the blended lubricant may be set so that the evaporation residue in the aforementioned n-heptane extract is within a predetermined range. In control of the aforementioned bleeding amount, usually, the blend amount of lubricant may vary depending on, for instance, the types of the layers into which the lubricant is blended or the resins to form the layer, and it is difficult to determine indiscriminately. Usually however, the blend amount of lubricant may be about 0.1 to 20% by mass in any case where the lubricant is blended in the olefin resin layer of the inner surface or the regrind layer.

There is no necessity of blending separately an inorganic porous agent in the regrind layer as long as the inorganic porous agent of a predetermined amount is blended only in the olefin resin layer of the inner surface (inner surface layer).

In the present invention, an olefin resin layer not being blended with an inorganic porous agent can be placed adjacent to the inner surface layer, as a replacement of or together with the regrind layer. Similarly in this case, the lubricant may be included in the olefin resin layer. However, since the inorganic porous agent is blended selectively in the inner surface layer, the use amount of the inorganic porous agent can be reduced to maximize the effect of preventing the flavor from degrading.

As mentioned above, the container of the present invention may have various layer constitutions. Examples of the simplest layer structures consist of the following components, where AD denotes an adhesive layer.

(A) Single layer of olefin resin (containing inorganic porous agent and lubricant)
(B) Inner surface layer (containing inorganic porous agent and lubricant)/AD/lubricant-barrier layer/AD/outer surface layer
(C) Inner surface layer (containing inorganic porous agent)/regrind layer (containing lubricant)/AD/lubricant-barrier layer/AD/outer surface layer In the aforementioned layer structures, the inner surface layer is a layer formed of an olefin resin, while the outer surface layer is preferably a layer formed of an olefin resin similar to that of the inner surface layer.

In the aforementioned layer constitution, an olefin resin layer not being blended with the inorganic porous agent can be placed adjacent to the olefin resin layer of the inner surface.

In each of the aforementioned layers, various compounding agents known per se, such as pigments and UV absorbers, can be blended as required in a range not degrading the properties required for the respective layers.

The thickness of each layer may be determined not to be greater than required while the functions of the layer is exhibited effectively, within a range not to degrade the bleeding property of the lubricant onto the container inner surface.

In the present invention, the inner surface layer formed of an olefin resin layer that includes a lubricant and in which the inorganic porous agent is blended has an average surface roughness Ra (JIS-B-0601-1994) set to be not more than 0.3 μm in spite of the blended inorganic porous agent, because the inorganic porous agent is not used as a roughening agent as mentioned above.

In particular, when a low-density polyethylene having a high bleeding property is used as an olefin resin for forming the inner surface layer, a melt fracture may be generated easily during formation of a container, which may cause a rough skin called sharkskin on the surface. Such a failure in appearance can be avoided effectively by adjusting the surface roughness within the range through a step of mirror-finishing of the mold, for instance.

Form of Container:

The container of the present invention may be prepared, for instance, as parison for forming a film, a sheet, a bottle, a cap, and a tube, or a preform for forming a pipe, a bottle or a tube, and it may be produced in any method known per se.

For instance, it is possible to produce parison for forming a film, a sheet, a cap, and a tube, or a preform for forming a pipe, a bottle or a tube, by a co-extrusion forming method, a co-injection method, a sequential injection method and the like, using extruders or injection forming machines of a number corresponding to the respective layers. Further, a thus obtained film can be biaxially stretched to make a stretched film.

Bottle formation from parison, a pipe or a preform can be carried out easily by pinching an extrudate off with a pair of split molds and blowing a fluid into the interior, for instance.

A stretched bottle or the like can be obtained by cooling a pipe or a preform and then heating it to a stretch temperature to stretch in the axial direction, and also blow-stretching in the circumferential direction with a fluid pressure.

Furthermore, the film or the sheet is subjected to any means for vacuum forming, pressure forming, stretch-expand forming, and plug-assist forming, to obtain a packaging container shaped like a cup or a tray.

In such a forming process, the surface of a mold for shaping the inner surface layer is mirror-finished in advance so that the average surface roughness Ra of the container inner surface layer can be set to be not more than 0.3 μm.

The FIGURE shows a direct blow forming bottle as the most suitable form of the container of the present invention.

In the FIGURE, the bottle denoted as the numeral 10 as a whole has a neck portion 11 with a thread, a body portion wall 15 extended to the neck portion 11 through a shoulder portion 13 and a bottom wall 17 closing the lower end of the body portion wall 15. A viscous and dense substance contained in the bottle 10 may be discharged by squeezing the bottle at body portion wall 15. The bottle 10 is sealed at the mouth portion with a sealing foil 19 such as an aluminum foil, at which further a cap 20 is mounted to go on the market.

In the bottle 10 of the present invention, the aforementioned organic bleeding lubricant bleeds to be distributed on the inner surface of the bottle, whereby the bottle exhibits an excellent slip-down property with respect to the contents. Further, since the inorganic porous agent is blended in the olefin resin layer of the container inner surface, the flavor retention with respect to the content is favorable.

Therefore, the containers of the present invention represented by the bottle 10 are used suitably for containing viscous and dense contents.

Since the container of the present invention exhibits an excellent slip-down property with respect to contents, it is used suitably as a container to contain a highly viscous substance having a viscosity of not less than 1260 mPa·s at 25° C. for instance. While the slip-down property tends to deteriorate for emulsions, in particular, emulsions containing only small amounts of oils (fats), the container of the present invention exhibits an excellent slip-down property even with respect to the emulsion containing a smaller amount of oil. Furthermore, since the flavor of the content can be retained, it is suitably used for containing foods. The container is used especially suitably for non-oily substances such as ketchup and further mayonnaise-type food, various dressings, and in particular, emulsions such as a low-calorie mayonnaise.

EXAMPLES

The present invention will be described below by referring to Examples.

Measurements and evaluations for the respective properties in Examples and Comparative Examples were carried out in the following manner.

<n-Heptane Extract Evaporation Residue Measurement>

The thus obtained bottle was subjected to measurement of evaporation residue in conformity with Notification No. 370 by Ministry of Health and Welfare by using n-heptane as an extract under elution conditions of 25° C.-60 minutes.

<Slip-Down Property Evaluation>

The thus obtained plastic bottle (container) was filled with a low-calorie mayonnaise of a specified amount (500 g) at a room temperature (23° C.). The bottle was pressed at the body portion just after the filling and after one-month storage at 23° C. (over time) to squeeze out for exhausting the content through the bottle mouth portion, and then air was introduced into the bottle to restore the shape.

Later, the bottle was stored upside-down (the mouth portion facing downward) in a refrigerator for one day to measure the degree of slip-down of the content at the bottle body portion, thereby calculating a content slip-down rate by the equation below:

Content slip-down rate (%)=('Surface area from which content has slipped down'/'Bottle body portion wall surface area')×100

Based on the content slip-down rate measured in the aforementioned manner, the slip-down property was evaluated in accordance with the following criteria.

⊚: Content slip-down rate is 90% or higher
○: Content slip-down rate is 70% or higher and lower than 90%
Δ: Content slip-down rate is 50% or higher and lower than 70%
X: Content slip-down rate is lower than 50%

<Flavor Property Evaluation>

The thus obtained bottles were heat-sealed at the mouth portions with aluminum foils, and stored at 23° C. for one month. Then, the aluminum foils were peeled off from the bottles to functionally evaluate the odor inside the bottles. The evaluation was based on the following criteria.

⊚: The bottle does not smell of decomposed lubricant, and does not smell of polyethylene of container
○: The bottle does not smell of decomposed lubricant, and it smells of polyethylene of container
Δ: The bottle smells slightly of decomposed lubricant within a permissible range, and it smells of polyethylene of container
X: The bottle smells of decomposed lubricant, and it smells of polyethylene of container <Transparency Evaluation>

A specimen of 40 mm in length×40 mm in width was cut out from the body portion of each of the obtained bottles. The specimen was subjected to a measurement of Haze (%) with a turbidimeter NDH1001 manufactured by NIPPON DENSHOKU INDUSTRIES Co., LTD. The evaluation was based on the following criteria.

⊚: Less than 20%
○: 20% or more and less than 30%
Δ: 30% or more and less than 40%
X: 40% or more <Surface Roughness Measurement>

A specimen of 40 mm in length×40 mm in width was cut out from the body portion of each of the obtained bottles. For the bottle inner surface side of the specimen, the arithmetic mean surface roughness Ra was measured in conformity with JIS-B-0601-1994 at a measurement rate of 0.3 mm/s by using SURFCOM2000SD3 manufactured by TOKYO SEIMITSU CO., LTD.

<Organic Bleeding Lubricant Melting Point Measurement>

The melting point of the organic bleeding lubricant was measured with a differential scanning calorimeter (DSC). In a case where the melting peak was broad, the temperature at the peak maximum value was employed.

<Measurement of Average Particle Diameter of Inorganic Porous Agent>

The average particle diameter of the inorganic porous agent was the average particle diameter ($D_{50}$) in terms of volume measured by a laser diffraction scattering method.

Example 1

A multilayered parison including six layers of five types was formed by using five extruders. This multilayered parison was subjected to a direct blow forming to obtain a plastic bottle constituted of six layers of five types (internal volume: 500 ml) having a shape as shown in the FIGURE. The material of the inner surface layer was prepared by mixing the following resin pellets, the organic bleeding lubricant, and an inorganic porous agent before the extrusion.

Outer surface layer (75 μm)/adhesive layer (2.4 μm)/gas barrier layer (10 μm)/adhesive layer (2.4 μm)/main layer (180.2 μm)/inner surface layer (30 μm)

Materials for the respective layers are described below.

The low-density polyethylene is abbreviated as LDPE. Here, the main layer denotes an olefin resin layer in which neither an inorganic porous agent nor a lubricant is blended.

Outer surface layer;
LDPE (density: 0.921 g/cm$^3$)
Adhesive layer;
Acid-modified polyethylene
Gas barrier layer;
EVOH copolymer
Main layer;
LDPE (density: 0.921 g/cm$^3$)
Inner surface layer;
LDPE (density: 0.921 g/cm$^3$)
Organic bleeding lubricant:
Salad oil (melting point=−20° C.)
Blend amount=5.0% by mass
Inorganic porous agent:
High silica zeolite
Silica/alumina ratio=80
Average particle diameter=4.5 μm
Blend amount=1.0% by mass The bottle was subjected to evaluations for an n-heptane extract evaporation residue amount, a slip-down property, a flavor property, transparency, and surface roughness Ra of inner surface. The aspect of the bottle inner surface layer and the evaluation results are shown in Tables 1 and 2.

Example 2

A plastic bottle was prepared in the same manner as Example 1 except that the lubricant of the inner surface layer was replaced by erucic acid (melting point=34° C.) and the blend amount was changed to 10.0% by mass, and the respective evaluations were conducted. The evaluation results are shown in Tables 1 and 2.

Example 3

A plastic bottle was prepared in the same manner as Example 1 except that the lubricant of the inner surface layer was replaced by lauric acid (melting point=45° C.) and the blend amount was changed to 10.0% by mass, and the respective evaluations were conducted. The evaluation results are shown in Tables 1 and 2.

Example 4

A plastic bottle was prepared in the same manner as Example 1 except that the lubricant of the inner surface layer was replaced by medium chain fatty acid triglyceride (melting point=−6° C. or lower) as a fatty acid ester, and the respective evaluations were conducted. The evaluation results are shown in Tables 1 and 2.

Example 5

A plastic bottle was prepared in the same manner as Example 1 except that the blend amount of the lubricant in the inner surface layer was changed to 10.0% by mass, and the respective evaluations were conducted. The evaluation results are shown in Tables 1 and 2.

Example 6

A plastic bottle was prepared in the same manner as Example 1 except that the blend amount of the lubricant in the inner surface layer was changed to 7.0% by mass, and the respective evaluations were conducted. The evaluation results are shown in Tables 1 and 2.

Example 7

A plastic bottle was prepared in the same manner as Example 1 except that the blend amount of the lubricant in the inner surface layer was changed to 2.0% by mass, and the respective evaluations were conducted. The evaluation results are shown in Tables 1 and 2.

Example 8

A plastic bottle was prepared in the same manner as Example 1 except that the blend amount of the lubricant in the inner surface layer was changed to 0.5% by mass, and the respective evaluations were conducted. The evaluation results are shown in Tables 1 and 2.

Example 9

A plastic bottle was prepared in the same manner as Example 1 except that the inorganic porous agent in the inner surface layer was replaced by high silica zeolite having a molar ratio of silica/alumina of 33, and the respective evaluations were conducted. The evaluation results are shown in Tables 1 and 2.

Example 10

A plastic bottle was prepared in the same manner as Example 1 except that the blend amount of the inorganic porous agent in the inner surface layer was changed to 3.0% by mass, and the respective evaluations were conducted. The evaluation results are shown in Tables 1 and 2.

Example 11

A plastic bottle was formed in the same manner as Example 1 except that the blend amount of the inorganic porous agent in the inner surface layer was changed to 0.2% by mass, and the respective evaluations were conducted. The evaluation results are shown in Tables 1 and 2.

Example 12

A plastic bottle was formed in the same manner as Example 1 except that the inorganic porous agent in the inner surface layer was replaced by high silica zeolite having an average particle diameter of 0.5 μm, and the respective evaluations were conducted. The evaluation results are shown in Tables 1 and 2.

Example 13

A plastic bottle was formed in the same manner as Example 1 except that the inorganic porous agent in the inner surface layer was replaced by high silica zeolite having an average particle diameter of 0.5 μm and the blend amount was changed to 0.2% by mass, and the respective evaluations were conducted. The evaluation results are shown in Tables 1 and 2.

Example 14

A plastic bottle was formed in the same manner as Example 1 except that the resin of the inner surface layer was replaced by linear low-density polyethylene (LLDPE) having a density of 0.903 g/cm$^3$, and the respective evaluations were conducted. The evaluation results are shown in Tables 1 and 2.

Example 15

A plastic bottle was formed in the same manner as Example 1 except that the resin of the inner surface layer was replaced by linear low-density polyethylene (LLDPE) having a density of 0.935 g/cm$^3$, and the respective evaluations were conducted. The evaluation results are shown in Tables 1 and 2.

Example 16

A plastic bottle was formed in the same manner as Example 1 except that the inorganic porous agent in the inner surface layer was replaced by synthetic zeolite of type A (silica/alumina ratio=2) having an average particle diameter of 5.0 μm, and the respective evaluations were conducted. The evaluation results are shown in Tables 1 and 2.

Example 17

A plastic bottle was formed in the same manner as Example 1 except that the inorganic porous agent in the inner surface layer was replaced by natural silica having an average particle diameter of 5.0 μm, and the respective evaluations were conducted. The evaluation results are shown in Tables 1 and 2.

Comparative Example 1

A multilayered parison including seven layers of five types was formed by using five extruders. This multilayered parison was then subjected to a direct blow forming to obtain a plastic bottle constituted of seven layers of five type as described below (internal volume: 500 ml) having a shape as shown in the FIGURE. The material of the inner surface layer was prepared by mixing the following resin pellets, the organic bleeding lubricant, and an inorganic porous agent before the extrusion.

Outer surface layer (75 μm)/adhesive layer (2.4 μm)/gas barrier layer (10 μm)/adhesive layer (2.4 μm)/main layer (177.8 μm)/adhesive layer (2.4 μm)/inner surface layer (30 μm)

Materials for the respective layers are described below.
Outer surface layer;
LDPE (density: 0.921 g/cm³)
Adhesive layer;
Acid-modified polyethylene
Gas barrier layer;
EVOH copolymer
Main layer;
LDPE (density: 0.921 g/cm³)

Inner surface layer;
Amorphous polyester (PETG) (density: 1.27 g/cm³)
Organic bleeding lubricant;
Salad oil (melting point=−20° C.)
    Blend amount=5.0% by mass
Inorganic porous agent;
High silica zeolite
    Silica/alumina ratio=80
    Average particle diameter=4.5 μm
    Blend amount=1.0% by mass Comparative Example 2

A plastic bottle was formed in the same manner as Example 1 except that the organic bleeding lubricant was not blended in the inner surface layer, and the respective evaluations were conducted. The evaluation results are shown in Tables 1 and 2.

Comparative Example 3

A plastic bottle was formed in the same manner as Example 1 except that the inorganic porous agent was not blended in the inner surface layer, and the respective evaluations were conducted. The evaluation results are shown in Tables 1 and 2.

The abbreviations in the Tables are as follows
Ex: Example
Com: Comparative Example
Lubricant A: salad oil
Lubricant B: erucic acid
Lubricant C: lauric acid
Lubricant D: medium chain fatty acid triglyceride
HSZ: high silica zeolite
SZ: synthetic zeolite
NS: natural silica

TABLE 1

| | Inner surface layer | | | | | | | | |
|---|---|---|---|---|---|---|---|---|---|
| | Resin | | Lubricant | | | Inorganic porous agent | | | Inner surface average surface roughness Ra (μm) |
| | Type | Density (g/cm³) | Type | Melting point (° C.) | Blend amount (mass %) | Type | Average particle diameter (μm) | Silica/alumina (molar ratio) | Blend amount (mass %) | |
| Ex-1 | LDPE | 0.921 | A | −20 | 5.0 | HSZ | 4.5 | 100 | 1.0 | 0.15 |
| Ex-2 | LDPE | 0.921 | B | 34 | 10.0 | HSZ | 4.5 | 100 | 1.0 | 0.15 |
| Ex-3 | LDPE | 0.921 | C | 45 | 10.0 | HSZ | 4.5 | 100 | 1.0 | 0.15 |
| Ex-4 | LDPE | 0.921 | D | * | 5.0 | HSZ | 4.5 | 100 | 1.0 | 0.15 |
| Ex-5 | LDPE | 0.921 | A | −20 | 10.0 | HSZ | 4.5 | 100 | 1.0 | 0.15 |
| Ex-6 | LDPE | 0.921 | A | −20 | 7.0 | HSZ | 4.5 | 100 | 1.0 | 0.15 |
| Ex-7 | LDPE | 0.921 | A | −20 | 2.0 | HSZ | 4.5 | 100 | 1.0 | 0.15 |
| Ex-8 | LDPE | 0.921 | A | −20 | 0.5 | HSZ | 4.5 | 100 | 1.0 | 0.15 |
| Ex-9 | LDPE | 0.921 | A | −20 | 5.0 | HSZ | 4.5 | 33 | 1.0 | 0.15 |
| Ex-10 | LDPE | 0.921 | A | −20 | 5.0 | HSZ | 4.5 | 100 | 3.0 | 0.30 |
| Ex-11 | LDPE | 0.921 | A | −20 | 5.0 | HSZ | 4.5 | 100 | 0.2 | 0.10 |
| Ex-12 | LDPE | 0.921 | A | −20 | 5.0 | HSZ | 0.5 | 100 | 1.0 | 0.12 |
| Ex-13 | LDPE | 0.921 | A | −20 | 5.0 | HSZ | 0.5 | 100 | 0.2 | 0.08 |
| Ex-14 | LLDPE | 0.903 | A | −20 | 5.0 | HSZ | 4.5 | 100 | 1.0 | 0.12 |
| Ex-15 | LLDPE | 0.935 | A | −20 | 5.0 | HSZ | 4.5 | 100 | 1.0 | 0.18 |
| Ex-16 | LDPE | 0.921 | A | −20 | 5.0 | SZ | 5.0 | 2 | 1.0 | 0.25 |
| Ex-17 | LDPE | 0.921 | A | −20 | 5.0 | NS | 5.0 | — | 1.0 | 0.25 |
| Com-1 | PETG | 1.27 | A | −20 | 5.0 | HSZ | 4.5 | 100 | 1.0 | 0.05 |
| Com-2 | LDPE | 0.921 | | None | | HSZ | 4.5 | 100 | 1.0 | 0.15 |
| Com-3 | LDPE | 0.921 | A | −20 | 5.0 | | None | | | 0.07 |

*: −6 or lower

TABLE 2

| | n-heptane evaporation residue (μg/ml) | Slip-down property | | Flavor property | Transparency |
|---|---|---|---|---|---|
| | | Just after filling | After certain time | | |
| Ex-1 | 80 | ⊚ | ◯ | ⊚ | ◯ |
| Ex-2 | 15 | Δ | Δ | ⊚ | ◯ |
| Ex-3 | 10 | Δ | Δ | ⊚ | ◯ |
| Ex-4 | 10 | Δ | Δ | ⊚ | ◯ |
| Ex-5 | 150 | ⊚ | ⊚ | Δ | ◯ |
| Ex-6 | 110 | ⊚ | ⊚ | ◯ | ◯ |
| Ex-7 | 30 | ◯ | ◯ | ⊚ | ◯ |
| Ex-8 | 10 | Δ | Δ | ⊚ | ◯ |
| Ex-9 | 85 | ⊚ | ◯ | Δ | ◯ |
| Ex-10 | 70 | ⊚ | ◯ | ⊚ | Δ |
| Ex-11 | 85 | ⊚ | ◯ | Δ | ⊚ |
| Ex-12 | 75 | ⊚ | ◯ | ⊚ | ◯ |
| Ex-13 | 80 | ⊚ | ◯ | Δ | ⊚ |
| Ex-14 | 20 | ◯ | Δ | ⊚ | ◯ |

TABLE 2-continued

| | n-heptane evaporation residue (μg/ml) | Slip-down property | | | |
| --- | --- | --- | --- | --- | --- |
| | | Just after filling | After certain time | Flavor property | Transparency |
| Ex-15 | 85 | ◎ | ○ | ◎ | ○ |
| Ex-16 | 40 | ○ | Δ | Δ | ○ |
| Ex-17 | 45 | ○ | Δ | Δ | ○ |
| Com-1 | 5 or less | X | X | ◎ | ○ |
| Com-2 | 5 or less | X | X | ◎ | ○ |
| Com-3 | 75 | ◎ | Δ | X | ◎ |

EXPLANATIONS OF LETTERS OR NUMERALS

10: direct blow forming bottle
11: neck portion
13: shoulder portion
15: body portion wall
17: bottom wall

What is claimed is:

1. A method of producing a directly blow-formed container which comprises subjecting a multilayered parison having an inner surface formed of an olefin resin to direct blow forming, said olefin resin comprising (i) an organic bleeding lubricant having a melting point of not higher than 50° C. in an amount of 5 to 10% by mass, and (ii) a high silica zeolite having a silica/alumina mole ratio of not less than 80 in an amount of 0.2 to 3.0% by mass, wherein the organic bleeding lubricant is a vegetable oil.

2. The method as set forth in claim 1, wherein the high silica zeolite has a mean particle size of 0.1 to 4.9 μm.

3. The method as set forth in claim 2, wherein the high silica zeolite has a mean particle size of 0.5 to 4.5 μm.

* * * * *